United States Patent
Osaka et al.

[11] Patent Number: 6,120,918
[45] Date of Patent: Sep. 19, 2000

[54] CO-FE-NI THIN MAGNETIC FILM, PROCESS FOR PRODUCING THE SAME, COMPOSITE THIN FILM MAGNETIC HEAD, AND MAGNETIC RECORDING DEVICE

[75] Inventors: Tetsuya Osaka; Mikiko Saito; Kazuhiko Yamada, all of Tokyo; Keishi Ohashi; Yoshihiko Yasue, both of Ibaraki, all of Japan

[73] Assignee: NEC Corporation, Tokyo, Japan

[21] Appl. No.: 09/108,252

[22] Filed: Jul. 1, 1998

[30] Foreign Application Priority Data

Jul. 3, 1997 [JP] Japan .................................. 9-178214
Jan. 21, 1998 [JP] Japan .................................. 10-009545

[51] Int. Cl.[7] ................................................ G11B 5/66
[52] U.S. Cl. ................ 428/692; 428/694 T; 428/900; 427/128; 427/129; 427/130; 360/113
[58] Field of Search ............................. 428/692, 694 T, 428/900; 427/128–130; 360/113

[56] References Cited

U.S. PATENT DOCUMENTS

| | | | |
|---|---|---|---|
| 5,057,380 | 10/1991 | Hayashi et al. | 428/692 |
| 5,480,694 | 1/1996 | Diamon et al. | 428/64.1 |
| 5,585,196 | 12/1996 | Inomoto et al. | 428/557 |
| 5,614,329 | 3/1997 | Shimizu et al. | 428/694 T |
| 5,674,637 | 10/1997 | Miyazaki | 428/694 T |
| 5,766,781 | 6/1998 | Kitaori | 428/694 T |

FOREIGN PATENT DOCUMENTS 5-263170 10/1993 Japan .
8-241503 9/1996 Japan .
8-321010 12/1996 Japan .

*Primary Examiner*—Leszek Kiliman
*Attorney, Agent, or Firm*—McGinn & Gibb, P.C.

[57] ABSTRACT

A thin Co—Fe—Ni magnetic film comprising from 40% to 70% by weight of cobalt, from 20% to 40% by weight of iron, and from 10% to 20% of nickel, and having a crystal structure of a mixed crystal with an $\alpha$ phase of a body-centered cubic structure and a $\gamma$ phase of a face-centered cubic structure.

18 Claims, 8 Drawing Sheets

CO-FE-NI THIN MAGNETIC FILM, PROCESS FOR PRODUCING THE SAME, COMPOSITE THIN FILM MAGNETIC HEAD, AND MAGNETIC RECORDING DEVICE

BACKGROUND OF THE INVENTION

The present invention relates to magnetic pole material for a composite thin-film magnetic head and a process for producing the same, as well as a composite thin-film magnetic head manufactured with the magnetic pole material and a magnetic recording device comprising such a magnetic head.

Magnetic heads mounted on a magnetic disk device are required to provide higher and steeper magnetic field for magnetic recording of higher density. More recent magnetic heads comprise both a magneto-resistance effect element for read of information and an inductive head element for recording of information. Such magnetic heads are typically referred to as a composite thin-film magnetic head and have been dominant in these days.

In the composite thin-film magnetic heads of the type described, magnetic material is used for an upper magnetic layer, or else both upper and lower magnetic layers, of the inductive head element and is required to have a high saturation magnetic flux density to provide a high magnetic field for writing. The magnetic material is also required to be excited easily as a result of flowing an electrical current through a write coil. Taking the above into consideration, it is necessary for the magnetic material for the composite thin-film magnetic heads to have a small coercive force and a high magnetic permeability. In other words, good soft magnetic material should be selected for this purpose.

An example of the magnetic material that meets the above requirements is a Ni—Fe (nickel—iron) alloy film called a permalloy. Among permalloy films of various formulations, one with approximately 82% nickel content is typically used as the magnetic material for the upper and the lower magnetic layers of the inductive head element because of its having a magnetostrictive constant of nearly equal to zero. Such a permalloy is hereinafter referred to as an "82% permalloy". The 82% permalloy has a saturation magnetic flux density of approximately 9,000–10,000 gauss. The good soft magnetic material having the higher saturation magnetic flux density can provide a magnetic head with a higher and steeper magnetic field for writing.

Various materials have been proposed as the soft magnetic material for the magnetic heads that have the higher saturation magnetic flux density than the 82% permalloy does. In particular, Co—Fe—Ni (cobalt—iron—nickel) ternary alloy films are of great concern because they have a small coercive force and a small magnetostrictive constant while allowing the saturation magnetic flux density of 14,000 gauss or higher. Thus, the Co—Fe—Ni ternary alloy films have been examined on their formulation and possible applications as additives.

However, conventional Co—Fe—Ni ternary alloy films usually have an iron content of 25% by weight or smaller. Such a ternary alloy film can provide the saturation magnetic flux density of 14,000–18,000 gauss at the highest. Higher saturation magnetic flux density cannot be obtained with the conventional Co—Fe—Ni ternary alloy films.

On the other hand, the magnetic material having the higher saturation magnetic flux density should be used for the upper or the lower magnetic layer in order to achieve recording at a higher density.

SUMMARY OF THE INVENTION

Therefore, an object of the present invention is to provide a thin Co—Fe—Ni magnetic film, which the film has a small coercive force and a small magnetostrictive constant while allowing a saturation magnetic flux density of 20,000 gauss or higher.

Another object of the present invention is to provide a production process suitable for the above-mentioned thin Co—Fe—Ni magnetic film.

It is yet another object of the present invention to provide a composite thin-film magnetic head with the above-mentioned thin Co—Fe—Ni magnetic film.

It is still another object of the present invention to provide a magnetic recording device with the above-mentioned composite thin-film magnetic head.

According to an aspect of the present invention, there is provided a thin Co—Fe—Ni magnetic film comprising from 40% to 70% by weight of cobalt, from 20% to 40% by weight of iron, and from 10% to 20% of nickel and having a crystal structure of a mixed crystal with an α phase of a body-centered cubic structure and a γ phase of a face-centered cubic structure.

According to another aspect of the present invention, there is provided a thin Co—Fe—Ni magnetic film comprising from 40% to 70% by weight of cobalt, from 20% to 40% by weight of iron, and from 10% to 20% of nickel and having a substantially face-centered cubic structure in which diffraction by an X-ray or an electron beam is observed from (111), (200), and (220) faces at the neighborhood which consists of a mixed crystal with an α phase of a body-centered cubic structure and a γ phase of a face-centered cubic structure.

According to yet another aspect of the present invention, there is provided a process for producing the above-mentioned thin Co—Fe—Ni magnetic film. The process for producing the thin Co—Fe—Ni magnetic film comprises the step of, with a plating bath including only a surfactant as an organic additive, electroplating at a current density ranging from 3 to 20 mA/cm$^2$.

A process for producing a thin co—Fe—Ni magnetic film according to yet another aspect of the present invention comprises the step of, after depositing the above-mentioned thin Co—Fe—Ni magnetic film, subjecting the film to a heat treatment at a temperature of 100–300° C.

DESCRIPTION OF THE PREFERRED EMBODIMENTS

For the purpose of facilitating the understanding of the present invention, a conventional Co—Fe—Ni ternary alloy film is described first. A first example of a conventional alloy film of this type is described in, for example, Japanese Patent Laid-open No. Tokkai Hei 5-263170 (263170/1993). This document discloses a thin film magnetic head with a thin Co—Fe—Ni film which the film contains from 60% to 90% by weight of cobalt, from 3% to 9% by weight of iron, and from 5% to 15% by weight of nickel.

A second example of a conventional alloy film of this type is described in, for example, Japanese Patent Laid-open No. Tokkai Hei 8-241503 (241503/1996). This document discloses a thin film magnetic head with a thin Co—Fe—Ni film which the film contains from 60% to 80% by weight of cobalt, from 8% to 25% by weight of iron, and from 15% to 25% by weight of nickel.

A third example of a conventional alloy film of this type is described in, for example, Japanese Patent Laid-open No. Tokkai Hei 8-321010 (321010/1996). This document discloses a thin film magnetic head with a thin Co—Fe—Ni film which the film contains from 60% to 75% by weight of cobalt, from 3% to 9% by weight of iron, and from 17% to 25% by weight of nickel.

Figure 1:
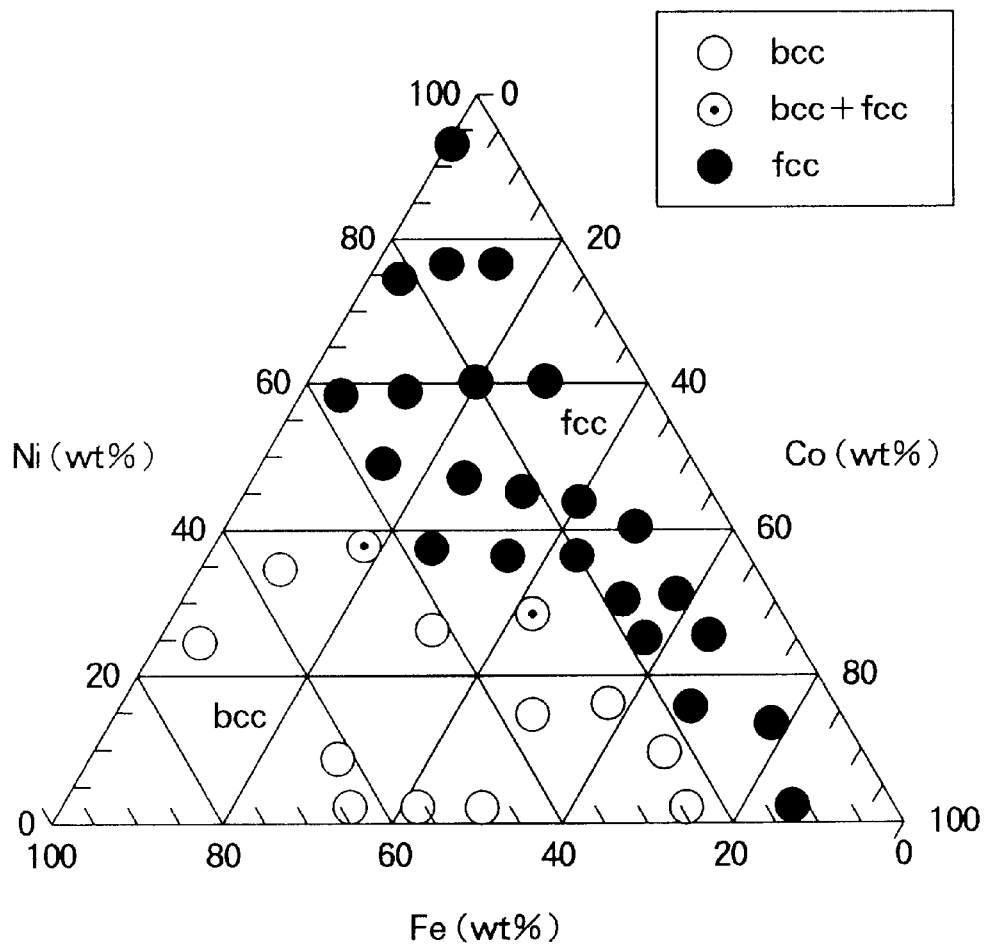
FIG. 1 is a view illustrating a crystal phase of a Co—Fe—Ni ternary alloy film produced by means of a conventional technique.

Referring to FIG. 1, the description will be made with regard to a crystal phase of a Co—Fe—Ni ternary alloy film produced by means of a conventional production process. A formulation of a plating bath used and plating conditions are given in Table 1 below.

TABLE 1

| COMPONENT | | CONTENT |
| --- | --- | --- |
| Plating Bath Formulation | Cobalt Sulfate | 0–28.1 g/l |
| | Nickel Sulfate | 0–26.3 g/l |
| | Iron (II) Sulfate | 0–27.8 g/l |
| | Boric Acid | 15.0 g/l |
| | Saccharin Sodium | 2.0 g/l |
| | Sodium Dodecyl Sulfate | 0.01 g/l |
| Conditions | Current Density | 15.0 mA/cm$^2$ |
| | pH | 2.8 |

As apparent from FIG. 1, an additive is introduced into the conventional plating bath for stress relaxation, intended to avoid peeling off of a plated film. Organic compounds with sulfur, such as saccharin sodium, are often used as the additive for stress relaxation. With this additive, the sulfur in the organic compound is incorporated into a plated film as a sulfate, providing stress relaxation of the film. A content of the sulfur impurity in the plated bath is approximately 0.1% to 1% by weight.

Figure 2:
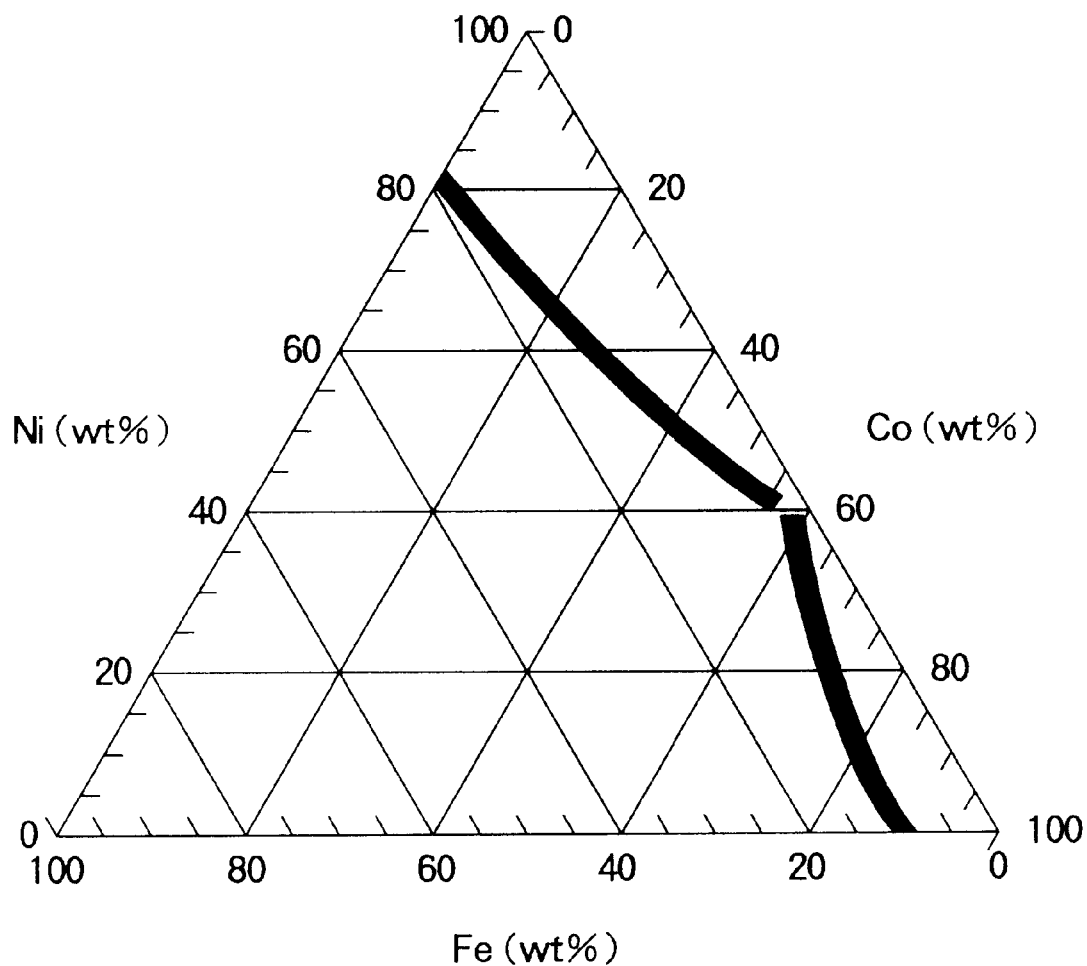
FIG. 2 is a view illustrating a line corresponding to a magnetostrictive constant of equal to zero on a Co—Fe—Ni ternary alloy film produced by means of a conventional technique.

Referring to FIG. 2, the description will proceed to a curved line corresponding to a magnetostrictive constant of equal to zero on the Co—Fe—Ni ternary alloy film produced under the conditions given in Table 1. In FIG. 2, the formulation with which the magnetostrictive constant becomes equal to zero lies on a first line between a first point and a second point and on a second line between the second point and a third point. The first point is defined by approximately 90% by weight of cobalt and approximately 10% by weight of iron. The second point is defined by approximately 60% by weight of cobalt and approximately 40% by weight of nickel. The third point is defined by approximately 18% by weight of iron and approximately 82% by weight of nickel. This formulation does not the same as the one obtained on or near a curved line corresponding to a mixed crystal with a face-centered cubic (fcc) phase and a body-centered cubic (bcc) phase shown in FIG. 1.

Figure 3:
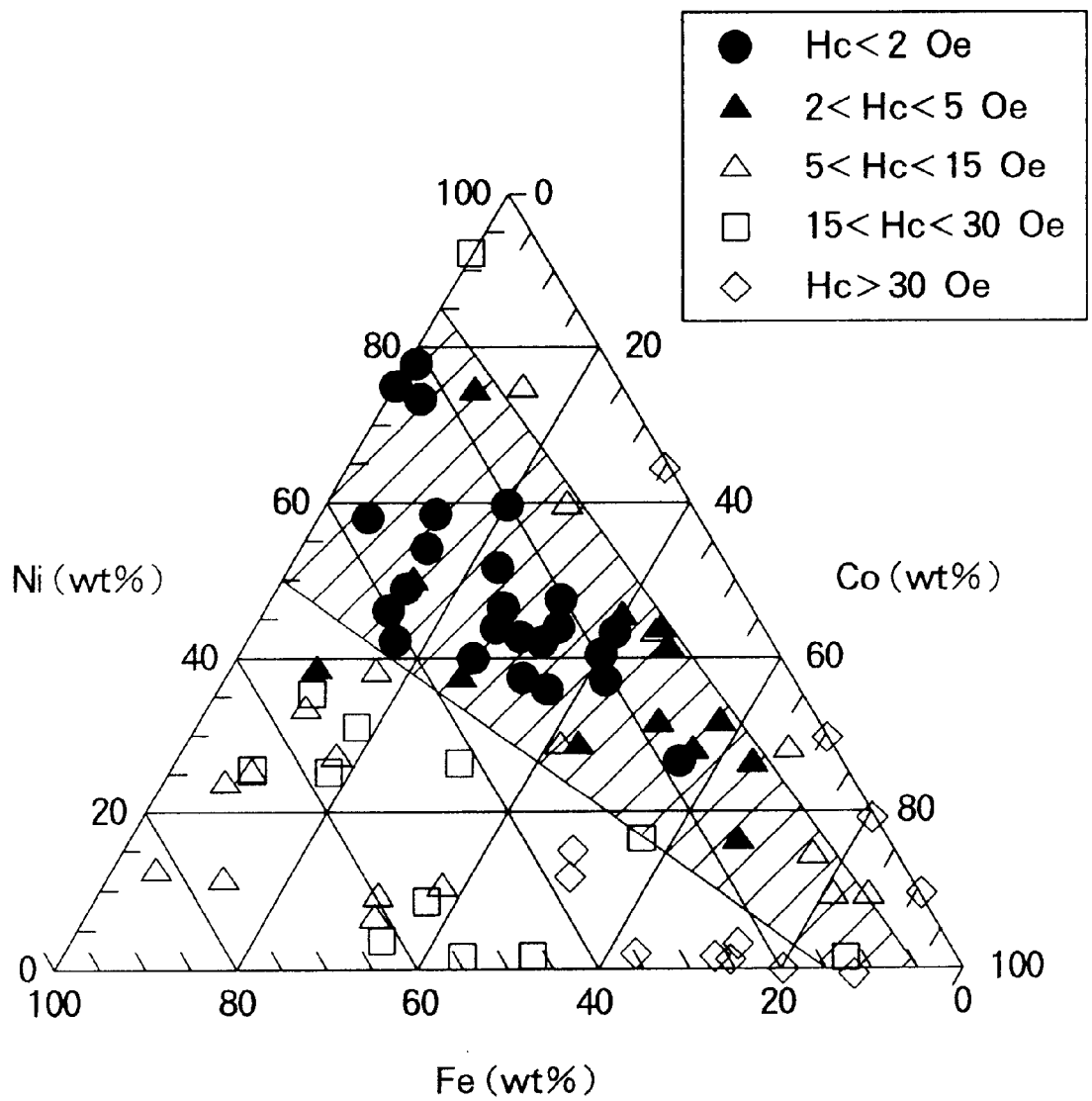
FIG. 3 is a view for use in describing a coercive force of a Co—Fe—Ni ternary alloy film produced by means of a conventional technique.

Referring to FIG. 3, distribution of a coercive force is described for a Co—Fe—Ni ternary alloy film produced under the conditions given in Table 1. In FIG. 3, the coercive force not larger than 5 Oersted can be observed on the region between where the mixed crystal exists with the fcc phase and the bcc phase and the line of the zero magnetostrictive constant. In other words, the coercive force not larger than 5 Oersted can be observed only on a strip-shaped region from a binary alloy of iron and nickel, containing about 15–50% by weight of iron to a binary alloy of iron and cobalt, containing about 5–20% by weight of iron.

The formulation in the first through the third examples described above are all in the strip shaped region. In other words, the conventional Co—Fe—Ni ternary alloy films have an iron content of less than 25% by weight. The saturation magnetic flux density of a resultant thin film is of the order of 14,000–18,000 gauss. No higher saturation magnetic flux density can be obtained with the conventional Co—Fe—Ni ternary alloy films.

Figure 4:
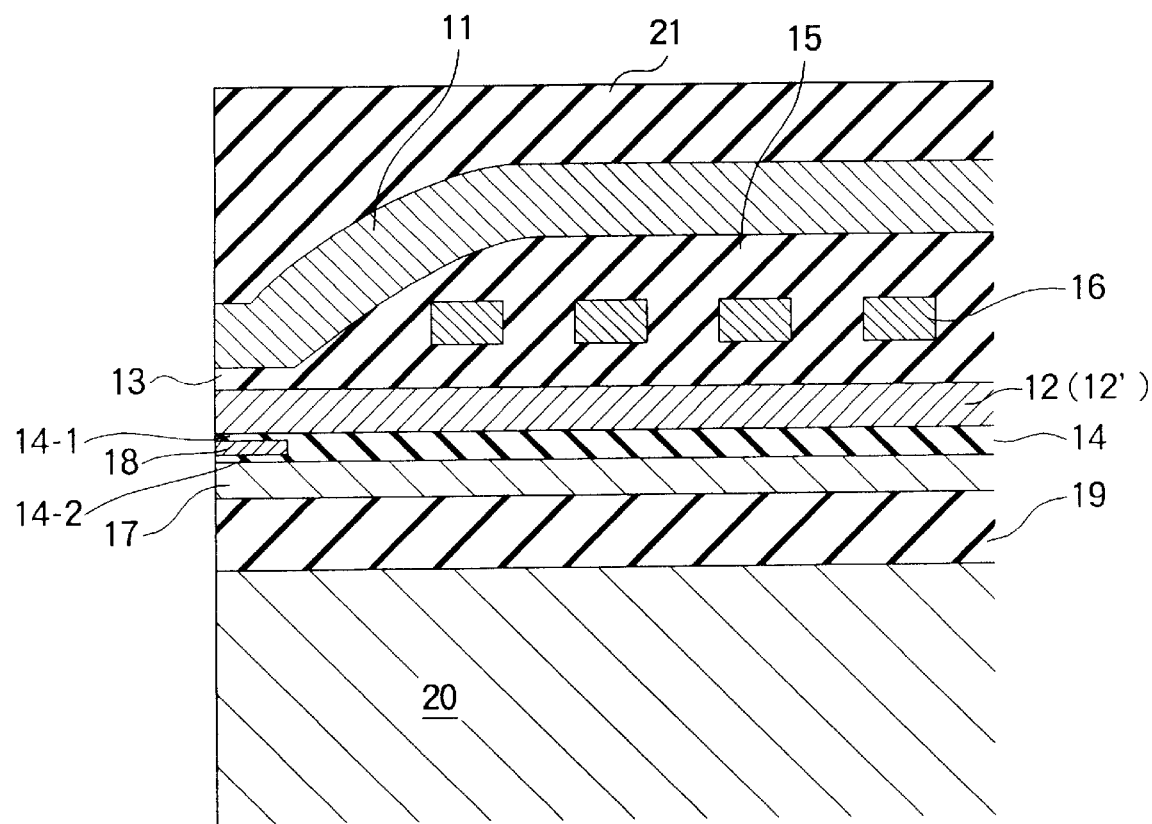
FIG. 4 is a cross-sectional view showing essentials of a composite thin-film magnetic head according to a first embodiment of the present invention.

Referring to FIG. 4, a composite thin-film magnetic head according to a first embodiment of the present invention is described. The composite thin-film magnetic head comprises an inductive head element formed of an upper magnetic layer 11 and a lower magnetic layer 12. A part or whole of the layers 11 and 12 comprises a thin Co—Fe—Ni magnetic film. This Co—Fe—Ni film is produced in the following manner. Underplates are provided by, for example, sputtering on insulating layers (gap layers) 13 and 14, respectively. A thin Co—Fe—Ni magnetic film is formed on the underplates by means of electroplating in a manner described below.

A film thickness of the upper and the lower magnetic layers 11 and 12 is 6 μm or smaller, and preferably about 3 μm. Such a film thickness is for avoiding reduction of the magnetic permeability at a high frequency due to a possible eddy current.

The composite thin-film magnetic head comprises a magnetic head for recording and a magnetic head for read. The magnetic head for recording is formed according to the following procedure. The insulating layer 13 is laminated on the upper magnetic layer. A write coil 16 is provided on the insulating layer 13. The write coil 16 is formed of an insulating layer 15 and a patterned conductive layer. The upper magnetic layer 11 is laminated on the insulating layer 15. On the other hand, the magnetic head for read is formed according to the following procedure. A magneto-resistance effect element 18 is mounted on a portion of a lower shielding layer 17 at one end thereof such that the magneto-resistance effect element 18 is sandwiched by the opposing insulating layers 14 in the vertical direction. An upper shielding layer 12' is laminated thereon. Regions 14-1 and 14-2 of the insulating layer 14 may also be referred to as gap layers that sandwich the magneto-resistive effect element 18 in the vertical direction.

In the first embodiment, the lower magnetic layer 12 is the upper shielding layer 12' itself. The lower shielding layer 17 is provided on a cover layer 19 formed of alumina. The cover layer 19 is provided on an alumina-titanium carbide substrate 20 by means of, for example, sputtering. The upper magnetic layer 11 is covered with a cover layer 21. The cover layer 21 is made of alumina by means of, for example, sputtering.

The composite thin-film magnetic head thus produced has the Co—Fe—Ni ternary alloy film with a high saturation magnetic flux density. This provides a larger capacity of writing than that achieved by the conventional composite thin-film magnetic head. The material with such a high saturation magnetic flux density for the upper and the lower magnetic layers 11 and 12 allows the magnetic layers to produce a large magnetic intensity and a high magnetic field gradient without being excessively saturated. Accordingly, a magnetic recording pattern can be written on a magnetic disc medium having a large coercive force with a low noise level and a high resolution.

Conventional composite thin-film magnetic heads write data on a magnetic disk having a coercive force of around 2,200–2,500 Oersted, with an average gap of about 40–70 nm between the surface of the magnetic disk and the magnetic head. On the contrary, the composite thin-film magnetic head of the present invention has an improved capacity of writing. A magnetic disk device that provides a higher recording density can be obtained by means of a combination of the magnetic head of the present invention and a magnetic disk medium having a large coercive force of at least 2,500 Oersted, or larger with a similar distance to the above between the magnetic disk surface and the head.

The upper magnetic layer 11 has a rather complex shape. This complexity in shape causes a local magnetic saturation to a larger degree than in the lower magnetic layer 12. Thus, the Co—Fe—Ni ternary alloy film may be used for only the upper magnetic layer 11. The lower magnetic layer 12 may be made of a well-known conventional permalloy, which also provides an improved writing capacity to some extent.

Figure 5:
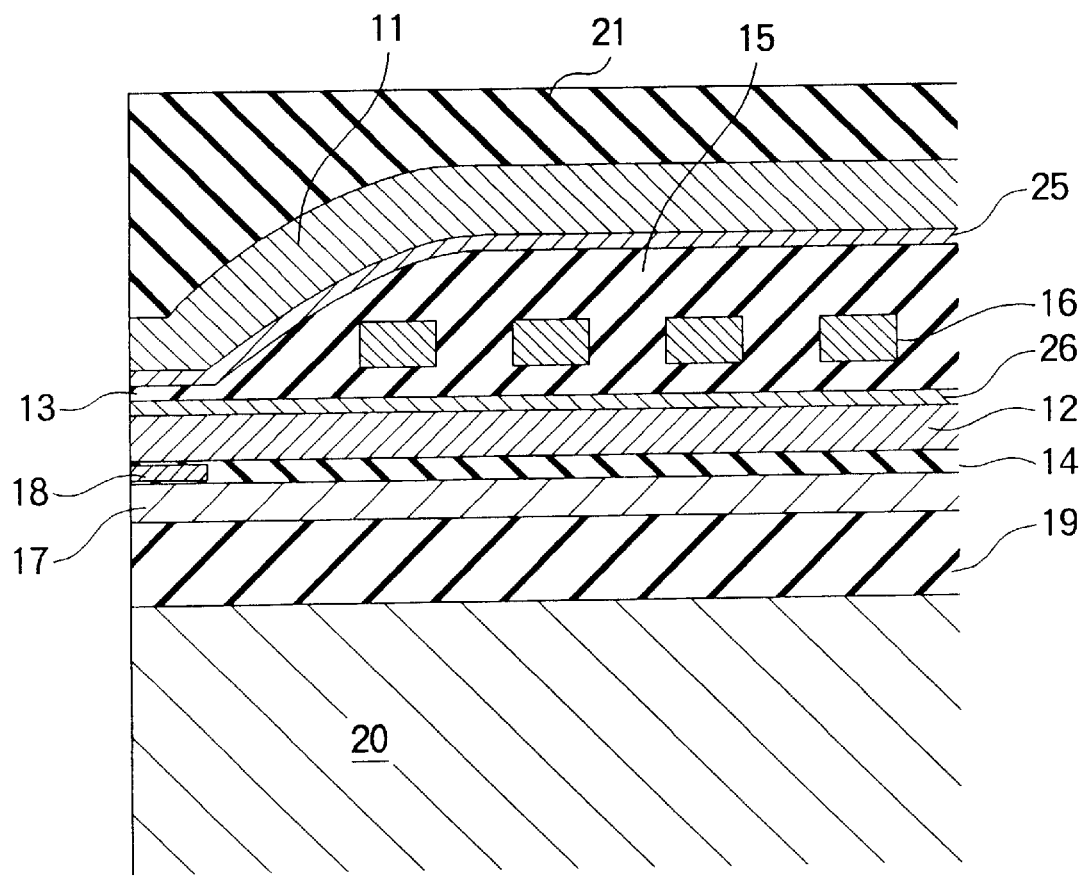
FIG. 5 is a cross-sectional view showing essentials of a composite thin-film magnetic head according to a second embodiment of the present invention.

Referring to FIG. 5, a composite thin-film magnetic head according to a second embodiment of the present invention is described. In FIG. 5, similar components and parts to those in FIG. 4 are depicted by like reference numerals and description of such components and parts will be omitted. In FIG. 5, an upper magnetic layer of the inductive head element is formed of the upper magnetic layer 11 and a Co—Fe—Ni thin magnetic film 25. A lower magnetic layer thereof is formed of the lower magnetic layer 12 and a Co—Fe—Ni thin magnetic film 26. In other words, the combination of the upper magnetic layer 11 and the Co—Fe—Ni thin magnetic film 25 serves as the upper magnetic layer of the inductive head element while the combination of the lower magnetic layer 12 and the Co—Fe—Ni thin magnetic film 26 serves as the lower magnetic layer of the inductive head element.

In the second embodiment, the Co—Fe—Ni thin magnetic films 25 and 26 are each 0.3 $\mu$m in thickness and formed under the upper magnetic layer 11 and over the lower magnetic layer 12, respectively. The upper and the lower magnetic layers 11 and 12 are formed of a well-known permalloy to a thickness of 3–5 $\mu$m. In the composite thin-film magnetic head according to the second embodiment, improvement of the writing capacity can be observed even with the Co—Fe—Ni thin magnetic films 25 and 26 of as thin as 0.1 $\mu$m.

The writing capacity can be improved to some extent without the Co—Fe—Ni thin magnetic film 26 provided over the lower magnetic layer 12. Should the lower magnetic layer be formed of only the permalloy, the magnetic field generated by the magnetic head will not increase to a degree as great as that of the saturation magnetic flux density even when the Co—Fe—Ni thin magnetic film 25 on the upper magnetic layer 11 has a film thickness of 0.5 $\mu$m or larger. More specifically, the magnetic field generated by the magnetic head increases to only about 20% upon calculation. The magnetic field gradient is, however, improved significantly due to elimination of magnetic saturation of the Co—Fe—Ni thin magnetic film 25 and the upper magnetic layer 11.

Figure 6:
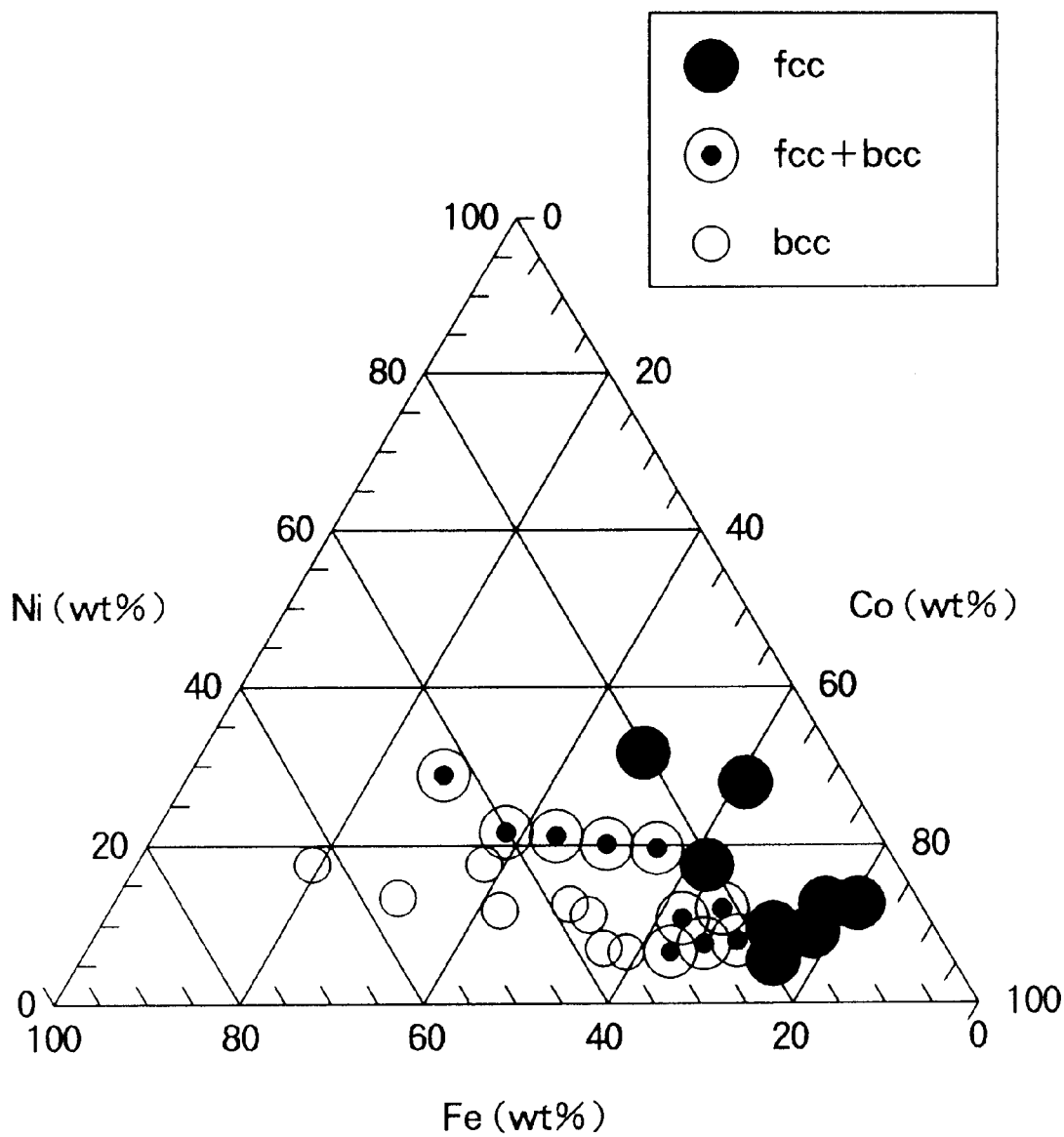
FIG. 6 is a view illustrating a crystal phase of a Co—Fe—Ni ternary alloy film according to the present invention.

Next, production of the Co—Fe—Ni thin magnetic film applied to the composite thin-film magnetic head illustrated in FIGS. 4 and 5 is described. FIG. 6 is a view showing a crystal phase of a Co—Fe—Ni ternary alloy film produced with a plating bath that contains no saccharin. An example of the plating bath formulation and plating conditions is given in Table 2 below.

TABLE 2

| COMPONENT | | CONTENT |
|---|---|---|
| Plating Bath Formulation | Cobalt Sulfate | 8.4–24.6 g/l |
| | Nickel Sulfate | 52.6 g/l |
| | Iron (II) Sulfate | 1.4–12.5 g/l |
| | Boric Acid | 15.0 g/l |
| | Sodium Dodecyl Sulfate | 0.01 g/l |
| Conditions | Current Density | 15.0 mA/cm$^2$ |
| | pH | 2.8 |

In the formulation in Table 2, sodium dodecyl sulfate acts as a surfactant.

Figure 7:
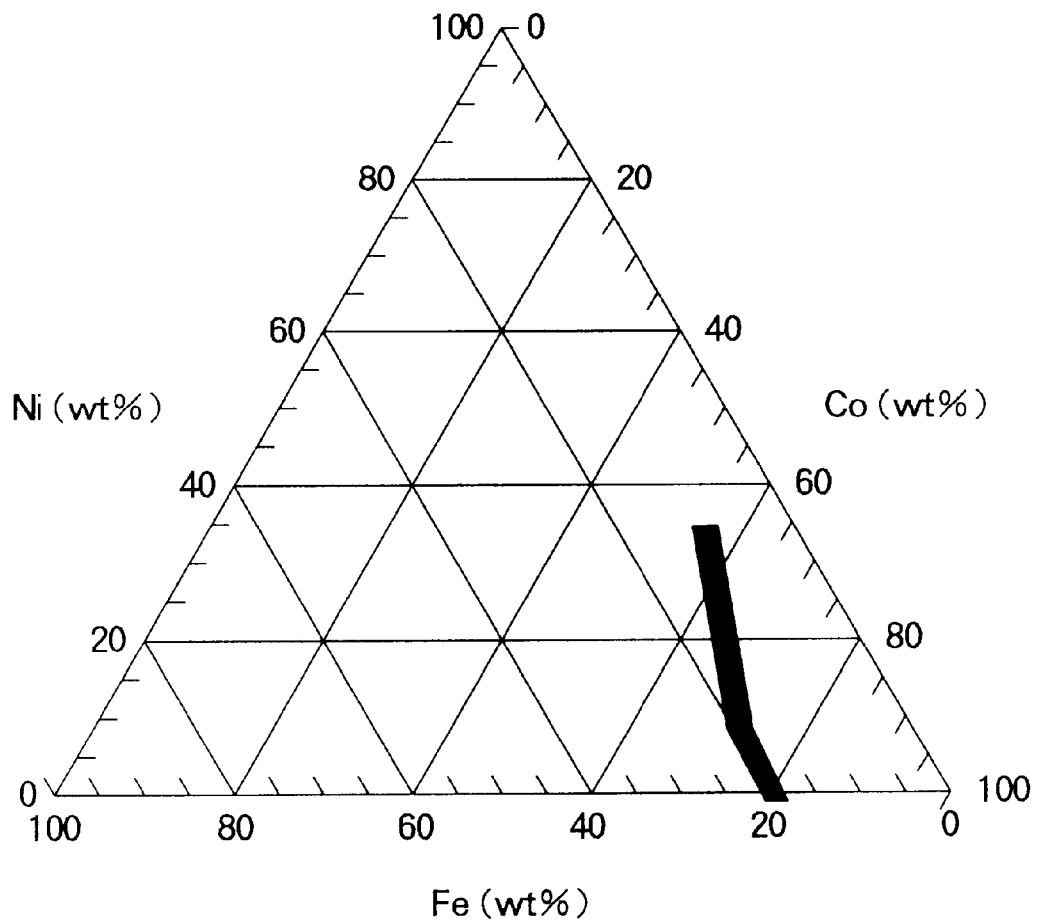
FIG. 7 is a view illustrating a line corresponding to a magnetostrictive constant of equal to zero on a Co—Fe—Ni ternary alloy film according to the present invention.

FIG. 7 is a view illustrating a line corresponding to a magnetostrictive constant of equal to zero on a Co—Fe—Ni ternary alloy film according to the present invention that is produced under the conditions given in Table 2 above. The formulation with which the magnetostrictive constant becomes equal to zero lies on a line between a first point and a second point. The first point is defined by approximately 80% by weight of cobalt and approximately 20% by weight of iron. The second point is defined by approximately 60% by weight of cobalt, approximately 10% by weight of iron, and approximately 30% by weight of nickel. The line shifts or displaces toward the formulation having a larger iron content by about 10% by weight than the case in FIG. 2 where saccharin sodium is incorporated as an additive.

Figure 8:
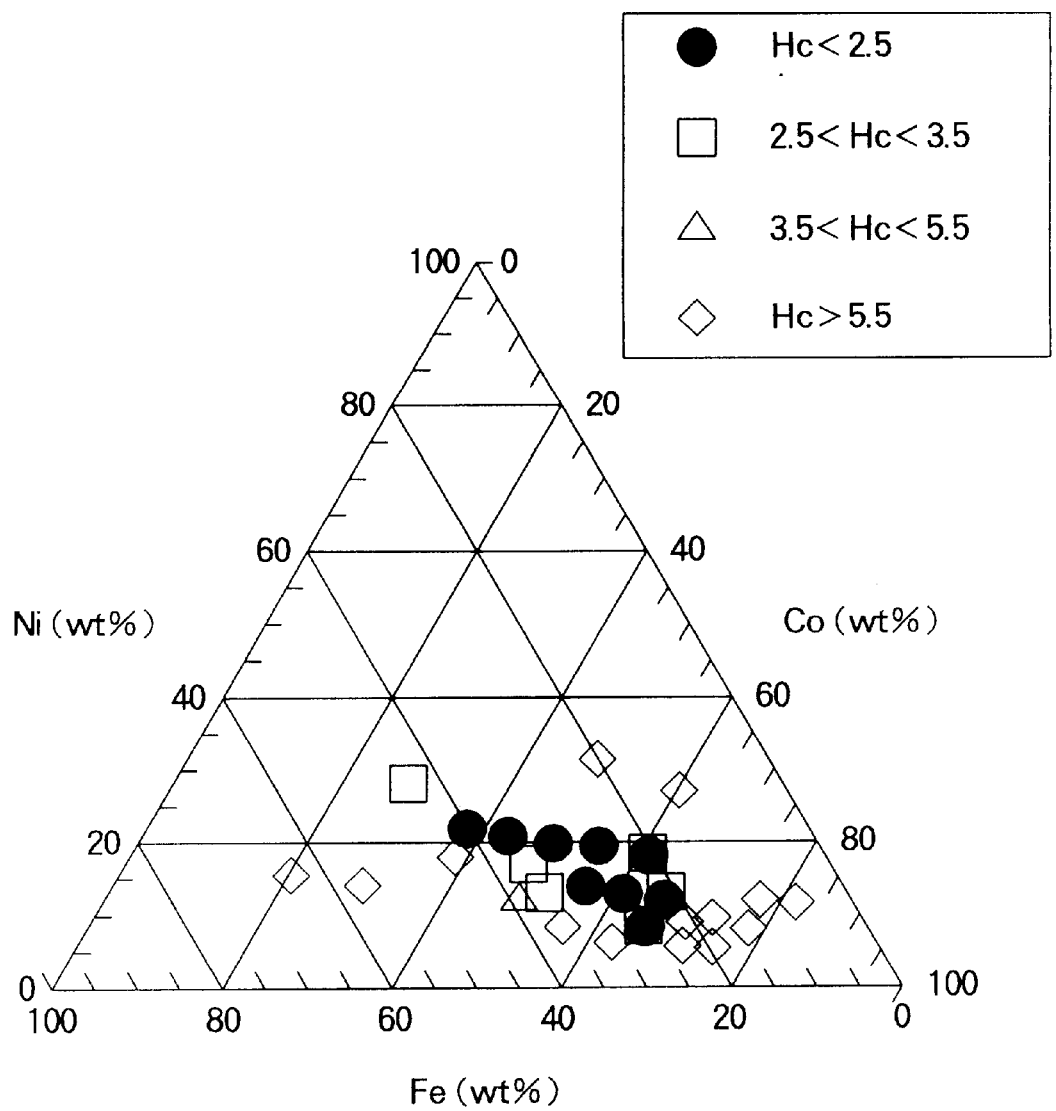
FIG. 8 is a view for use in describing a coercive force of a Co—Fe—Ni ternary alloy film according to the present invention.

FIG. 8 is a view for use in describing a coercive force of a Co—Fe—Ni ternary alloy film according to the present invention. The coercive force becomes 2.5 Oersted or smaller in the region defined by 30–70% by weight of cobalt, 30–50% by weight of iron, and 10–20% by weight of nickel. Thus good soft magnetic characteristics can be obtained.

Referring to FIGS. 3 and 8, the present invention is compared with the conventional art. FIG. 3 shows the formulation with which the good soft magnetic characteristics can be obtained on the Co—Fe—Ni ternary alloy film, with the addition of saccharin sodium as an additive for the stress relaxation. FIG. 8 shows the formulation region in which the good soft magnetic characteristics can be obtained on the Co—Fe—Ni ternary alloy film that is produced by using a plating bath without addition of any additive for the stress relaxation. The formulation region according to the present invention has a 30–40% by weight lower nickel content and a 30–40% by weight higher cobalt content than the conventional formulation region.

As described above, when provided under the conditions set forth in Table 1 with the additive for the stress relaxation, the mixed crystal with the fcc phase and the bcc phase can be obtained in a limited narrow region near the curved line between the first and second points, in which the first point is defined by approximately 80% by weight of cobalt and approximately 20% by weight of iron and the second point is defined by approximately 50% by weight of iron and approximately 50% by weight of nickel. On the contrary, the present invention that uses no additive for the stress relaxation can provide a larger region of mixed crystal with the fcc and the bcc phases. More specifically, the region exists around the curved line between the first and the second points, in which the first point is defined by approximately 80% by weight of cobalt and approximately 20% by weight of iron and the second point is defined by approximately 70% by weight of iron and approximately 30% by weight of nickel. In other words, the formulation corresponding to the mixed crystal spreads over a wide region defined by 30–70% by weight of cobalt, 20–50% by weight of iron, and 10–20% by weight of nickel.

As far as the present invention is concerned in which the film is produced by using the plating bath containing no additive for the stress relaxation, the region having a smaller coercive force shifts towards the region having a smaller nickel content. It is believed that the shift phenomenon mainly due to shifting of the mixed crystal region with the fcc and the bcc phases.

The zero line of the magnetostrictive constant shifts towards the region having a larger iron content. This would be a factor of the good soft magnetic characteristics of the Co—Fe—Ni ternary alloy film in a wider region when formed with a plating bath containing no stress relaxation additive.

Nickel in typical Co—Fe—Ni ternary alloys less affects a magnetic moment than iron and cobalt do. Therefore, a formulation having a smaller nickel content provides a higher saturation magnetic flux density. The saturation magnetic flux density becomes 5,000–8,000 gauss higher in the formulation with which the good soft magnetic characteristics can be obtained in the Co—Fe—Ni ternary alloy film than in the conventional formulation.

In addition, the good soft magnetic characteristics can be obtained not only in the mixed crystal region with the fcc and the bcc phases, but also a region where the fcc phase dominates at the neighborhood of the mixed crystal region with the fcc and the bcc phases. The Co—Fe—Ni ternary alloy film of the present invention exhibits diffraction by an X-ray or an electron beam from the (220) face as well as the (111) and (200) faces having the crystal status of the fcc phase. On the contrary, the Co—Fe—Ni ternary alloy film formed with the addition of the stress relaxation additive to the plating bath exhibits diffraction from the (111) and (200) faces having the crystal status of the fcc phase. However, no diffraction is observed from the (220) face. This indicates that the conventional Co—Fe—Ni ternary alloy film is inferior in crystallinity. Such inferior properties may be a cause of deterioration of the soft magnetic characteristics, the saturation magnetic flux density, and the corrosion resistance.

The Co—Fe—ni ternary alloy film of the present invention that contains no additive for the stress relaxation provides a superior film from the crystallinity viewpoint. For the above-mentioned effects, the sulfur content should be 0.1% by weight at maximum even when the incorporation due to the sulfur components contained in an atmosphere.

As described above, the Co—Fe—Ni ternary alloy film produced according to the process of the present invention has the high magnetic flux density and the good soft magnetic characteristics than the conventional ones.

In the above-mentioned production process, the plating bath contains no organic additive for the stress relaxation. Thus a resultant film may have a large stress when formed at a high current density and may be stripped or peeled off upon pattern plating. The strip of the film due to a large stress can be avoided by means of reducing the current density. For the pattern plating under the conditions given in Table 2, it was confirmed that a Co—Fe—Ni ternary alloy film having a film thickness of up to 0.3 µm can be formed under the current density of 20 mA/cm$^2$. It was also confirmed that a Co—Fe—Ni ternary alloy film having a film thickness of up to 0.1 µm can be formed under the current density of 10 mA/cm$^2$. Furthermore, a Co—Fe—Ni ternary alloy film having a film thickness of up to 2.0 µm can be formed under the current density of 3 mA/cm$^2$.

The Co—Fe—Ni ternary alloy film exhibits good corrosion resistance when subjected to a heat treatment. For example, the Co—Fe—Ni ternary alloy film formed at the current density of 3 mA/cm$^2$ has a pitting potential of −250 mV. On the other hand, the improved pitting potential of −40 mV was obtained for the Co—Fe—Ni ternary alloy film subjected to a vacuum heat treatment at 200° C. for 1 hour. An effect of the heat treatment on the corrosion resistance was observed at a temperature of 100° C. or higher. The superior corrosion resistance cannot be obtained in the conventional Co—Fe—Ni ternary alloy film formed with the addition of the stress relaxation additive to the plating bath.

Table 3 below shows an example of the plating bath formulation containing no stress relaxation agent and plating conditions according to the present invention.

TABLE 3

| COMPONENT | | CONTENT |
| --- | --- | --- |
| Plating Bath Formulation | Cobalt Sulfate | 8.4–24.6 g/l |
| | Nickel Sulfate | 52.6 g/l |
| | Iron (II) Sulfate | 1.4–12.5 g/l |
| | Boric Acid | 15.0 g/l |
| | Ammonium Chloride | 15.0 g/l |
| | Sodium Dodecyl Sulfate | 0.01 g/l |
| Conditions | Current Density | 3.0 mA/cm$^2$ |
| | pH | 2.5 |

In the example in Table 3, similar effects as in the example in Table 2 can be obtained.

As described above, according to the present invention, there is provided the thin magnetic film formulation having the high saturation magnetic flux density and the superior soft magnetic characteristics and the process for producing the same.

According to the process for producing a thin magnetic film, there is provided a thin magnetic film in which the film comprises from 30% to 70% by weight of cobalt, from 20% to 50% by weight of iron, and from 10% to 20% of nickel, and has a crystal structure of a mixed crystal with an α phase of a body-centered cubic structure and a γ phase of a face-centered cubic structure or a crystal structure dominated by a face-centered cubic structure at the neighborhood of a mixed crystal with an α phase of a body-centered cubic structure and a γ phase of a face-centered cubic structure. The thin magnetic film has the high magnetic flux density of 19,000–22,000 gauss and the coercive force of not larger than 2.5 Oersted. Therefore, a composite thin-film magnetic head with this thin magnetic film for the inductive head element can generate a higher magnetic field and a higher magnetic field gradient than the conventional composite thin-film magnetic heads. Therefore, combination of it with a medium of a large coercive force can increases the recording density provided by the magnetic recording device.

What is claimed is:

1. A thin Co—Fe—Ni magnetic film comprising from 40% to 70% by weight of cobalt, from 20% to 40% by weight of iron, and from 10% to 20% by weight of nickel, said film having a crystal structure of a mixed crystal with an $\alpha$ phase of a body-centered cubic structure and a $\gamma$ phase of a face-centered cubic structure.

2. A thin Co—Fe—Ni magnetic film as claimed in claim 1, further comprising a sulfur content of 0.1% by weight or less.

3. A process for producing a thin Co—Fe—Ni magnetic film comprising from 40% to 70% by weight of cobalt, from 20% to 40% by weight of iron, and from 10% to 20% by weight of nickel, said film having a crystal structure of a mixed crystal with an $\alpha$ phase of a body-centered cubic structure and a $\gamma$ phase of a face-centered cubic structure, the process comprising with a plating bath including only a surfactant as an organic additive, electroplating at a current density ranging from 3 to 20 mA/cm$^2$.

4. A process as claimed in claim 3, wherein the thin Co—Fe—Ni magnetic film has a sulfur content of 0.1% by weight or less.

5. A process for producing a thin Co—Fe—Ni magnetic film comprising from 40% to 70% by weight of cobalt, from 20% to 40% by weight of iron, and from 10% to 20% by weight of nickel, said film having a crystal structure of a mixed crystal with an $\alpha$ phase of a body-centered cubic structure and a $\gamma$ phase of a face-centered cubic structure, the process comprising after depositing the thin Co—Fe—Ni magnetic film, subjecting the film to a heat treatment at a temperature of 100–300° C.

6. A process as claimed in claim 5, wherein the thin Co—Fe—Ni magnetic film has a sulfur content of 0.1% by weight or less.

7. A thin Co—Fe—Ni magnetic film comprising from 40% to 70% by weight of cobalt, from 20% to 40% by weight of iron, and from 10% to 20% by weight of nickel, said film having a substantially face-centered cubic structure in which diffraction by an X-ray or an electron beam is observed from (111), (200), and (220) faces at a neighborhood that consists of a mixed crystal with an $\alpha$ phase of a body-centered cubic structure and a $\gamma$ phase of a face-centered cubic structure.

8. A thin Co—Fe—Ni magnetic film as claimed in claim 7, further comprising a sulfur content of 0.1% by weight or less.

9. A process for producing a thin Co—Fe—Ni magnetic film comprising from 40% to 70% by weight of cobalt, from 20% to 40% by weight of iron, and from 10% to 20% by weight of nickel, said film having a substantially face-centered cubic structure in which diffraction by an X-ray or an electron beam is observed from (111), (200), and (220) faces at a neighborhood that consists of a mixed crystal with an $\alpha$ phase of a body-centered cubic structure and a $\gamma$ phase of a face-centered cubic structure, the process comprising with a plating bath including only a surfactant as an organic additive, electroplating at a current density ranging from 3 to 20 mA/cm$^2$.

10. A process as claimed in claim 9, further comprising after depositing the thin Co—Fe—Ni magnetic film, subjecting the film to a heat treatment at a temperature of 100–300° C.

11. A composite thin-film magnetic head comprising a magneto-resistance effect element for read of information and an inductive head element for recording of information, a thin Co—Fe—Ni magnetic film as claimed in claim 1 is placed on a part or whole of upper and lower magnetic layers of the inductive head element.

12. A magnetic recording device comprising a composite thin-film magnetic head as claimed in claim 11 and a magnetic recording medium having a coercive force of 2,500 Oersted.

13. A composite thin-film magnetic head comprising a magneto-resistance effect element for reading of information and an inductive head element for recording of information, wherein a thin Co—Fe—Ni magnetic film as claimed in claim 2 is placed on a part or whole of upper and lower magnetic layers of the inductive head element.

14. A composite thin-film magnetic head comprising a magneto-resistance effect element for reading of information and an inductive head element for recording of information, wherein a thin Co—Fe—Ni magnetic film as claimed in claim 7 is placed on a part or whole of upper and lower magnetic layers of the inductive head element.

15. A composite thin-film magnetic head comprising a magneto-resistance effect element for reading of information and an inductive head element for recording of information, wherein a thin Co—Fe—Ni magnetic film as claimed in claim 8 is placed on a part or whole of upper and lower magnetic layers of the inductive head element.

16. A magnetic recording device comprising a composite thin-film magnetic head as claimed in claim 13 and a magnetic recording medium having a coercive force of 2,500 Oersted.

17. A magnetic recording device comprising a composite thin-film magnetic head as claimed in claim 14 and a magnetic recording medium having a coercive force of 2,500 Oersted.

18. A magnetic recording device comprising a composite thin-film magnetic head as claimed in claim 15 and a magnetic recording medium having a coercive force of 2,500 Oersted.

* * * * *

UNITED STATES PATENT AND TRADEMARK OFFICE
CERTIFICATE OF CORRECTION

PATENT NO. : 6,120,918
DATED : September 19, 2000
INVENTOR(S) : Osaka et al.

It is certified that error appears in the above-identified patent and that said Letters Patent are hereby corrected as shown below:

Title page, item [73], Assignee should read as follows:
--NEC Corporation, Tokyo, Japan and Waseda University, Tokyo, Japan--

Signed and Sealed this

Twenty-ninth Day of May, 2001

*Attest:*

NICHOLAS P. GODICI

*Attesting Officer*   *Acting Director of the United States Patent and Trademark Office*